United States Patent
Kleve et al.

(10) Patent No.: US 12,503,076 B2
(45) Date of Patent: Dec. 23, 2025

(54) KEY-FREE VEHICLE OPERATIONS MANAGEMENT SYSTEMS AND METHODS

(71) Applicant: Ford Global Technologies, LLC, Dearborn, MI (US)

(72) Inventors: Robert Bruce Kleve, Ann Arbor, MI (US); John Robert Van Wiemeersch, Novi, MI (US); John Eric Rollinger, Troy, MI (US); Scott Steadmon Thompson, Belleville, MI (US); Nicholas Herhusky, Dearborn, MI (US); Scott Christensen, Canton, MI (US); Adam J. Richards, Royal Oak, MI (US)

(*) Notice: Subject to any disclaimer, the term of this patent is extended or adjusted under 35 U.S.C. 154(b) by 654 days.

(21) Appl. No.: 16/926,553

(22) Filed: Jul. 10, 2020

(65) Prior Publication Data

US 2022/0009447 A1    Jan. 13, 2022

(51) Int. Cl.
| | | |
|---|---|---|
| B60R 25/30 | (2013.01) | |
| B60R 25/01 | (2013.01) | |
| B60R 25/25 | (2013.01) | |
| G01C 21/34 | (2006.01) | |

(Continued)

(52) U.S. Cl.
CPC ........... B60R 25/30 (2013.01); B60R 25/01 (2013.01); B60R 25/25 (2013.01); G01C 21/3461 (2013.01); H04W 4/021 (2013.01); H04W 4/44 (2018.02)

(58) Field of Classification Search
CPC ......... B60R 25/30; B60R 25/01; B60R 25/25; H04W 4/44; H04W 4/021; G01C 21/3461
See application file for complete search history.

(56) References Cited

U.S. PATENT DOCUMENTS

| | | |
|---|---|---|
| 8,581,713 B1 | 11/2013 | Morgan et al. |
| 9,165,412 B2 | 10/2015 | Gellatly et al. |
| 10,410,516 B1 * | 9/2019 | Andersson ............. G08G 1/052 |

(Continued)

OTHER PUBLICATIONS

Marco Della Cava, "Ready to Use Your Phone as a Car Key", USA Today, azcentral.com, Jan. 7, 2015, 3 pages.

(Continued)

*Primary Examiner* — Kito R Robinson
*Assistant Examiner* — Roy Rhee
(74) *Attorney, Agent, or Firm* — Frank Lollo; Eversheds Sutherland (US) LLP

(57) ABSTRACT

Example embodiments described in this disclosure are generally directed to the use of a multi-zone geofence for key-free vehicle operations management. The multi-zone geofence may include a first zone where vehicles can be operated without the use of keys or key fobs, and a second zone surrounding the first zone where a first set of functional restrictions are imposed upon the vehicles. The first set of functional restrictions can include an upper speed limit that is automatically imposed upon a vehicle. The multi-zone geofence can include additional zones having functional restrictions, such as a third zone surrounding the second zone wherein key-free vehicle operations are permitted with a second set of restrictions. The second set of restrictions may include a directional speed feature involving an automatic speed reduction upon a vehicle travelling towards a periphery of the third zone and lifting the speed reduction if the vehicle turns back.

4 Claims, 9 Drawing Sheets

(51) Int. Cl.
*H04W 4/021* (2018.01)
*H04W 4/44* (2018.01)

(56) References Cited

U.S. PATENT DOCUMENTS

| | | | | |
|---|---|---|---|---|
| 2009/0140886 A1* | 6/2009 | Bender | ................ | G08G 1/207 |
| | | | | 340/988 |
| 2009/0146846 A1* | 6/2009 | Grossman | .............. | G08B 29/22 |
| | | | | 340/988 |
| 2016/0364679 A1* | 12/2016 | Cao | ........................ | G06Q 50/30 |
| 2019/0193682 A1* | 6/2019 | Santiano | ................ | G08G 1/207 |

OTHER PUBLICATIONS

Continental Automotive, "Classic Access: Remote Keyless Entry", Aug. 28, 2019, 2 pages.

* cited by examiner

KEY-FREE VEHICLE OPERATIONS MANAGEMENT SYSTEMS AND METHODS

FIELD OF THE DISCLOSURE

This disclosure generally relates to vehicles, and more particularly relates to systems and methods for key-free vehicle operations management.

BACKGROUND

Organizations that deal with a fleet of vehicles, such as, for example, an automobile dealership, a golf course management company, or an amusement park operator, etc. have to take certain steps to safeguard the use of vehicle keys and/or key fobs. For example, salespeople in an automobile dealership may offer car keys or key fobs to various potential customers for performing test drives on various vehicles. In a typical setup, each salesperson checks out a key for test driving a vehicle after entering details in a log book or after informing an inventory manager. Both these procedures can be susceptible to errors and oversights. For example, a salesperson may overlook entering a key checkout in the log book or may forget to replace a key in a key rack after a test drive. In another example case, a vehicle key or key fob may be lost or misplaced. After returning from the test drive, the customer may forget to return the key to the dealership. It can then turn out to be time-consuming and problematic for the dealership to retrieve the key fob from the customer.

Another issue that has to be addressed by an automobile dealership (or any other organization dealing with a fleet of vehicles) pertains to theft. The automobile dealership, for example, may take steps to protect against stealing or misuse of a vehicle by making a copy of a driving license (or other such identification) of a customer prior to allowing the customer to take a test drive in the vehicle. The driving license can then be used to file a police report if the need arises. However, in at least some cases, the customer can use a fake driving license or employ some other ruse to steal the vehicle. In some reported incidents, referred to as key swapping, test drive customers may return a different unprogrammed identical stock key and keep the actual vehicle key with the intent to return after hours to steal the vehicle. If the vehicle ends up missing, it may be assumed the prior driver did the key swap, but it would be difficult to prove.

Another issue can arise in connection with operating a vehicle by a person such as a customer, a friend, or a valet, on a temporary basis. In such cases, the person can be permitted to have control of certain basic functions of the vehicle, such as, for example, starting the engine, driving the vehicle, operating the climate control system, and steering the vehicle. However, it is desirable that the person be restricted from performing actions such as, for example, driving above a speed limit or driving beyond a certain distance.

In view of at least the aspects described above, it is desirable to provide solutions that can eliminate the need to keep track of car keys or key fobs and also protect against vehicle theft.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
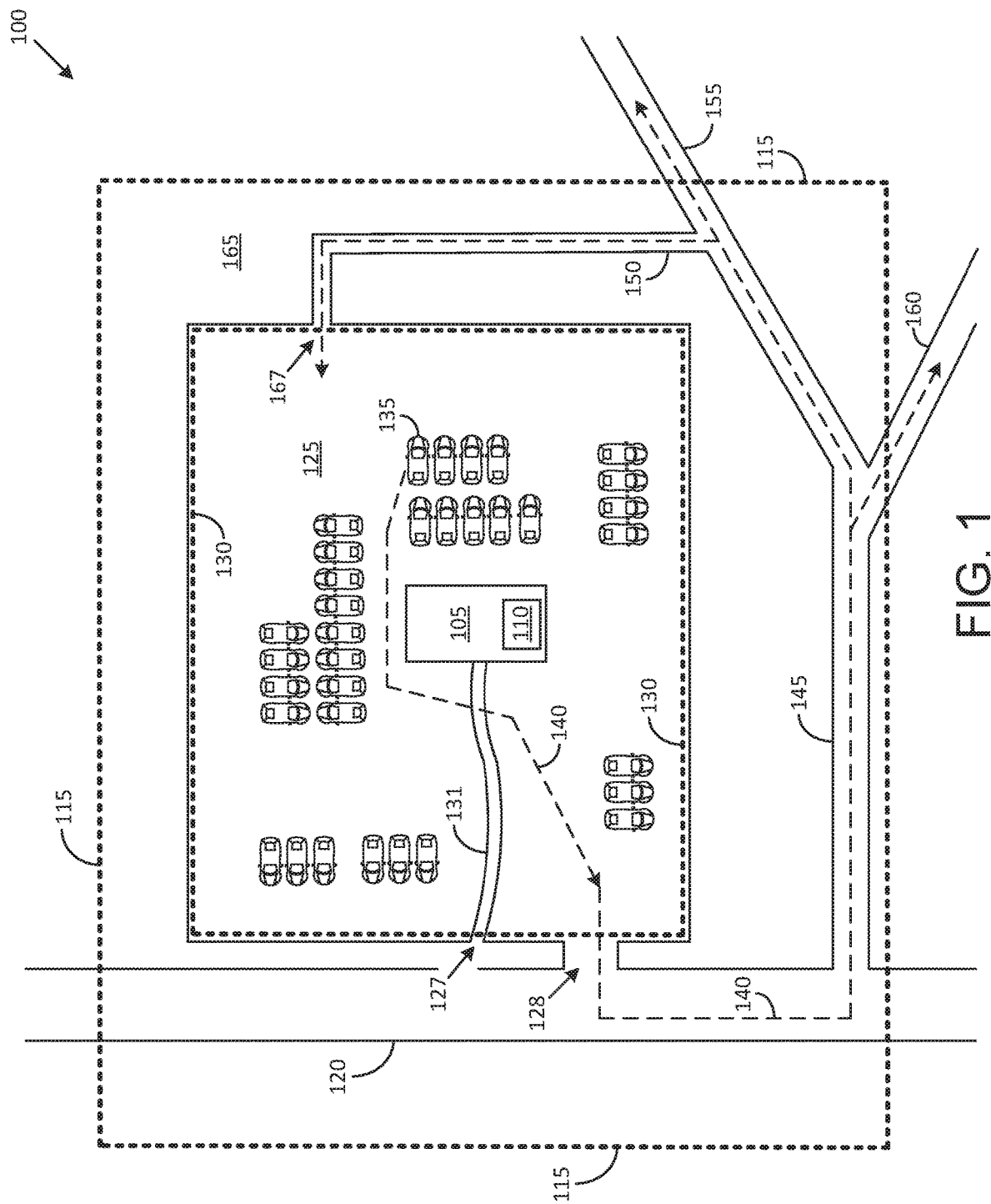
FIG. 1 illustrates a first key-free vehicle operations management system in accordance with an example embodiment of the disclosure.

In terms of a general overview, this disclosure is generally directed to systems and methods for key-free vehicle operations management. In one example method, a multi-zone geofence is used for managing key-free vehicle operations. The multi-zone geofence may include a first zone where multiple vehicles can be operated without the use of keys or key fobs and a second zone surrounding the first zone where a first set of functional restrictions are imposed upon one or more vehicles that are being operated without the use of keys or key fobs. The first set of functional restrictions can include actions such as automatically placing a speed limitation upon a vehicle traveling inside the second zone and issuing a warning notification when certain actions are carried out by a driver when inside the second zone.

The multi-zone geofence can include additional zones having additional functional restrictions. For example, the multi-zone geofence can include a third zone surrounding the second zone. Key-free vehicle operations may be permitted in the third zone with a second set of restrictions. The second set of restrictions can include actions such as applying a directional speed feature that involves an automatic speed reduction upon a vehicle travelling in the third zone towards a periphery of the third zone and lifting the directional speed reduction if the vehicle turns away from the periphery and starts travelling inwards towards the second zone. Some other features, such as providing an emergency driving route through the multi-zone geofence and disabling of key-free operations outside the multi-zone geofence, are described below. In some implementations, a limited set of functions may be permitted in some zones and/or in areas outside the multi-zone geofence, by enabling the use of a key, a key fob, and/or a code entered into a keypad in the vehicle.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the word "vehicle" as used in this disclosure can pertain to any one of various types of vehicles such as cars, vans, sports utility vehicles, trucks, electric vehicles, gasoline vehicles, hybrid vehicles, and autonomous vehicles. The phrase "key-free" as used in this disclosure generally refers to various operations that may be performed upon a vehicle without inserting a key into an ignition lock of the vehicle or using a passive entry passive start (PEPS) device such as a key fob or a smartphone. The phrase can further refer to actions performed by the use of methods such as code entry and biometric authentication with or without a key being present in a vehicle. In some cases, the description herein with respect to "key-free" operations may be equally applicable to operations carried out by use of a key having inherently limited functionality or a key that is programmed to provide limited functionality. The programming may be carried out in various ways, such as, for example, via wireless communications executed by a computer located inside or outside a vehicle.

Some example "key-free" operations can include starting an engine of a vehicle, entering a vehicle, and unlocking/locking a door of a vehicle. A "key-free zone" is an area within which "key-free" operations can be carried out upon a vehicle. The "key-free zone" may be defined and controlled by using one or more computers that wirelessly communicate with one or more vehicles in accordance with various embodiments of the disclosure. It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

FIG. 1 illustrates a first key-free vehicle operations management system 100 in accordance with an example embodiment of the disclosure. In a first example implementation of this embodiment, the key-free vehicle operations management system 100 is deployed in the premises of an automobile dealership. In other implementations, the key-free vehicle operations management system 100 can be deployed in other environments where one or more vehicles may be used for various purposes, such as, for example, a car rental agency, a golf course, a construction site, a business, a tourist resort, an amusement park, a campus, a warehouse, a seaside dock, a manufacturing facility, or a communal living facility.

The key-free vehicle operations management system 100 includes a multi-zone geofence having two zones. First zone 125 is a central zone that is demarcated by a boundary 130. A second zone 165 surrounds the first zone 125 and is demarcated by a boundary 115. Each of the first zone 125 and the second zone 165 has a rectangular shape. However, in other implementations, one or both of the first zone 125 and the second zone 165 can have a different shape (square, polygonal, oval, irregular, etc.). In this example, the boundary 130 of the first zone 125 may be defined to coincide with a property line of the automobile dealership. The boundary 115 of the second zone may be defined to include one or more roads that can be used for test driving vehicles offered for sale by the automobile dealership.

The multi-zone geofence may be configured and operated by an onsite computer 110 located on the premises of the automobile dealership, such as inside a sales office 105. In one example case, the boundary 130 and the boundary 115 can be defined by the onsite computer 110 by using Global Positioning System (GPS) coordinates. In some cases, the multi-zone geofence may be configured and operated by a computer that is located at a remote location away from the premises of the automobile dealership.

The onsite computer 110 may also be used to define and enforce operating conditions and restrictions for the vehicles that are sold by the automobile dealership. In one case, the vehicle operating conditions and other particulars pertaining to the multi-zone geofence may be wirelessly communicated by the onsite computer 110 to onboard computers located in the vehicles. In another case, the vehicle operating conditions and other particulars may be directly programmed into the onboard computers without using the onsite computer 110. Direct programming of an onboard computer of a vehicle may be performed by various entities such as, for example, a manufacturer during manufacture of the vehicle, or after manufacture of the vehicle such as by a technician at an automobile dealership or by a fleet management service operator.

In some instances, the onsite computer 110 may generate an inventory of all vehicles that are offered for sale by the automobile dealership, define the multi-zone geofence, and configure each of the inventoried vehicles to be operated key-free inside the multi-zone geofence. Subsequently, any salesman or customer can get into an inventoried vehicle and start the vehicle without using a traditional key or a PEPS device. This unfettered access and operability of the various vehicles can eliminate various error-prone and time-consuming procedures associated with tasks such as issuing, inventorying, and keeping track of vehicle keys. The sales force can therefore focus on vehicle sales without getting distracted or delayed by key handling procedures.

In one example configuration of the multi-zone geofence, key-free vehicle operations are permitted inside the first zone 125 with no functional restrictions placed on any of the inventoried vehicles sold by the automobile dealership. Consequently, a customer can get into any one or more of such vehicles without using a conventional key or a PEPS device or other access and authorization methods and drive around inside the first zone 125 to test out various features offered in each vehicle. For example, the customer may choose to drive a vehicle on a test strip (not shown) located inside the first zone 125. The customer may evaluate an acceleration characteristic (for example, from 0 to 100 mph in "x" seconds) and a stopping characteristic (hard, sudden braking) of a vehicle on the test strip without fear of being rear-ended by another vehicle.

Even though no functional restrictions have been placed upon the vehicles driven inside the first zone 125, the automobile dealership may choose to apply various speed limit rules inside certain areas of the first zone 125. Because the first zone 125 is private property, public speed rules may not be applicable. The automobile dealership may therefore allow a vehicle to be driven on the test strip at a speed that exceeds a speed limit applicable to public roads outside the automobile dealership and impose a speed limit in certain areas of the dealership that may be lower than speed limits on public roads outside the automobile dealership. For example, the automobile dealership may place a very low speed limit (5 mph, for example) on vehicles that are driven across a walkway 131. The walkway 131, which is located in the first zone 125 may be used by customers who enter the premises of the automobile dealership via a pedestrian entrance 127. The customers may walk on the walkway 131 to enter the sales office 105, or may step off the walkway 131 to inspect various vehicles parked on the premises. In implementations other than an automobile dealership, such as, for example, at a golf course, a construction site, a business, a tourist resort, an amusement park, a campus, a warehouse, a seaside dock, a manufacturing facility, or a communal living facility, a similar approach may be taken and various types of restrictions may be applied to various areas inside the first zone 125, such as, for example, speed limits, no-drive areas, one-way driving, and stopping spots.

The second zone 165 may encompass areas located partially or entirely outside the automobile dealership and may include public roads such as, for example, a public highway 120 that is accessible via a front entrance 128 of the automobile dealership and a road 150 that is accessible via a rear entrance 167 of the automobile dealership. The boundary 115 that demarcates the second zone 165 may be defined by the onsite computer 110 based on various criteria. In one example case, the boundary 115 may be defined by management of the automobile dealership so as to allow customers to take vehicles out for test drives on public roads. The public roads can be subject to various rules and regulations such as, for example, city ordinances, state-enforced speed rules, and/or federally-mandated speed rules.

Key-free vehicle operations may be permitted in the second zone 165. However, unlike in the first zone 125, vehicles that are operated key-free inside the second zone 165 may be subjected to one or more functional restrictions. For example, an onboard computer of each of these vehicles may be configured to automatically impose an upper speed limit when the vehicle is operated inside the second zone 165. This functional restriction prevents a customer from violating speed rules on the public roads even if the customer attempted to do so. As another example, an onboard computer of each of these vehicles may be configured to automatically transmit a message to the onsite computer 110 if the vehicle exits the second zone 165. The onboard computer may then disable key-free operations when the vehicle travels outside the second zone 165.

The on-site computer 110 may advise the vehicle operator of their entry into a new restriction zone and the nature of the restrictions. The information may be communicated with audio announcements and/or in-vehicle display pop-up alert notices. Further, the dealership or other vehicle administrators may configure alerts for the language of the authorized driver or those languages most convenient to the locale.

In an example operating scenario, a sales associate of the automobile dealership may offer a customer, an option to take a vehicle 135 for a test drive. The sales associate may inform the customer that the vehicle 135 is configured for key-free operations and explain to the customer, some of the features pertaining to key-free operations and the multi-zone geofence. The customer may then walk up to the vehicle 135, enter the vehicle 135 (without using a key), and start the vehicle by depressing an ignition button in the vehicle 135 (without the use of a key or a PEPS device). In some implementations, the eligibility of the customer to drive the vehicle 135 may be checked prior to enabling the vehicle 125 to support key-free operations by the customer. Various checks may be carried out by the onboard computer such as, for example, facial recognition and cross-referencing to a database. Various techniques may also be used to check the sobriety of the customer in some scenarios. For example, in a golf club environment, the sobriety of the customer may be checked by a breathalyzer test administered via the onboard computer prior to enabling a golf cart, for example, to support key-free operations.

In the example operating scenario illustrated in FIG. 1, the customer drives the vehicle 135 along a travel path 140 towards the front entrance 128 of the automobile dealership. The customer notices the speed limit posted near the walkway 131 and voluntarily slows down the vehicle 135 when driving across the walkway 131. There is no functional restriction on the vehicle 135 that automatically limits the speed of the vehicle 135 to the posted speed limit when the vehicle 135 is driven across the walkway 131.

The front entrance 128 of the automobile dealership leads to the public highway 120. In some cases, the public highway 120 may be a one-way divided highway with no left-turn allowed for traveling towards the public highway 145. In such cases, the onboard computer may issue an alert or warning to the customer prior to the vehicle 135 being driven out through the front entrance 128. The alert or warning may inform the driver that no left turn is allowed and to make a U-turn further ahead on the public highway 120 if the customer wishes to travel towards the public highway 145. At this time, the customer may decide to heed the warning and avoid entering the public highway 120.

In the illustrated embodiment, the public highway 120 is a two-way road. The customer may therefore exit through the front entrance 128 of the automobile dealership and turn left to travel towards the public highway 145. The onboard computer automatically applies a first speed limit on the vehicle 135 in accordance with the functional restriction applicable to the second zone 165 and may notify the driver of the new restriction. The first speed limit may correspond to a speed limit that is applicable to the public highway 120.

Upon reaching the public highway 145, the onboard computer may automatically apply a second speed limit on the vehicle 135 corresponding to a speed limit applicable to the public road 145. The driver can be notified of the new restriction. The second speed limit may be the same as, or different than, the first speed limit. Upon driving down the public road 145, the customer reaches a fork where the customer can opt to drive on a road 155 or on a road 160. If the customer decides to travel on the road 160, the onboard computer of the vehicle 135 may transmit a message to the onsite computer 110 to alert staff at the automobile dealership that the customer may be heading out of the second zone 165. The onboard computer may then execute one or more operations such as, for example, issuing a warning (an audible warning via an infotainment system of the vehicle 135, for example) advising the customer to turn around and head back towards the automobile dealership; slowing down the vehicle 135 as the vehicle approaches the boundary 115 of the second zone 165; automatically bringing the vehicle 135 to a halt after the vehicle 135 crosses the boundary 115; automatically disabling key-free operations once the vehicle 135 crosses the boundary 115; and/or shutting down the engine of the vehicle 135 after the vehicle 135 crosses the boundary 115. When key-free operations are disabled, the vehicle 135 requires a key or a PEPS device or other aforementioned valid access and authorization method to restart the engine and operate the vehicle 135.

If the customer turns the vehicle 135 around before crossing the boundary 115 and heads back towards the automobile dealership, the onboard computer stops slowing down the vehicle 135 and allows the driver to drive at any speed that is below the functional speed restriction applied to the vehicle 135 when traveling in the second zone 165.

The customer may then decide to turn into the road 155. Here again, the onboard computer in the vehicle 135 may execute operations such as the ones described above if the customer decides to travel out of the second zone 165. On the other hand, the customer may turn into the road 150 and head towards the rear entrance 167 of the automobile dealership. The road 150 may be a less-traveled road, so the onboard computer may allow the customer to carry out certain operations on the vehicle 135 such as, for example, a swerving maneuver in order to evaluate a handling characteristic of the vehicle 135 or an abrupt braking operation. For safety reasons, the onboard computer may functionally restrict the vehicle 135 from being operated in such a manner on other roads such as the public highway 120 where more traffic may be present.

In an example scenario, communications between the onsite computer 110 and the onboard computer of the vehicle 135 may be lost, for example, due to a failure in the onsite computer 110. In this scenario, the onboard computer of the vehicle 135 applies a set of default conditions, such as, for example, restricting driving of the vehicle 135 inside the first zone 125 and/or issuing a message advising the customer to contact a member of the automobile dealership in the sales office 105. The default condition may also permit driving the vehicle 135 via an emergency driving route through the multi-zone geofence. Further details about the emergency driving route are provided below.

Figure 2:
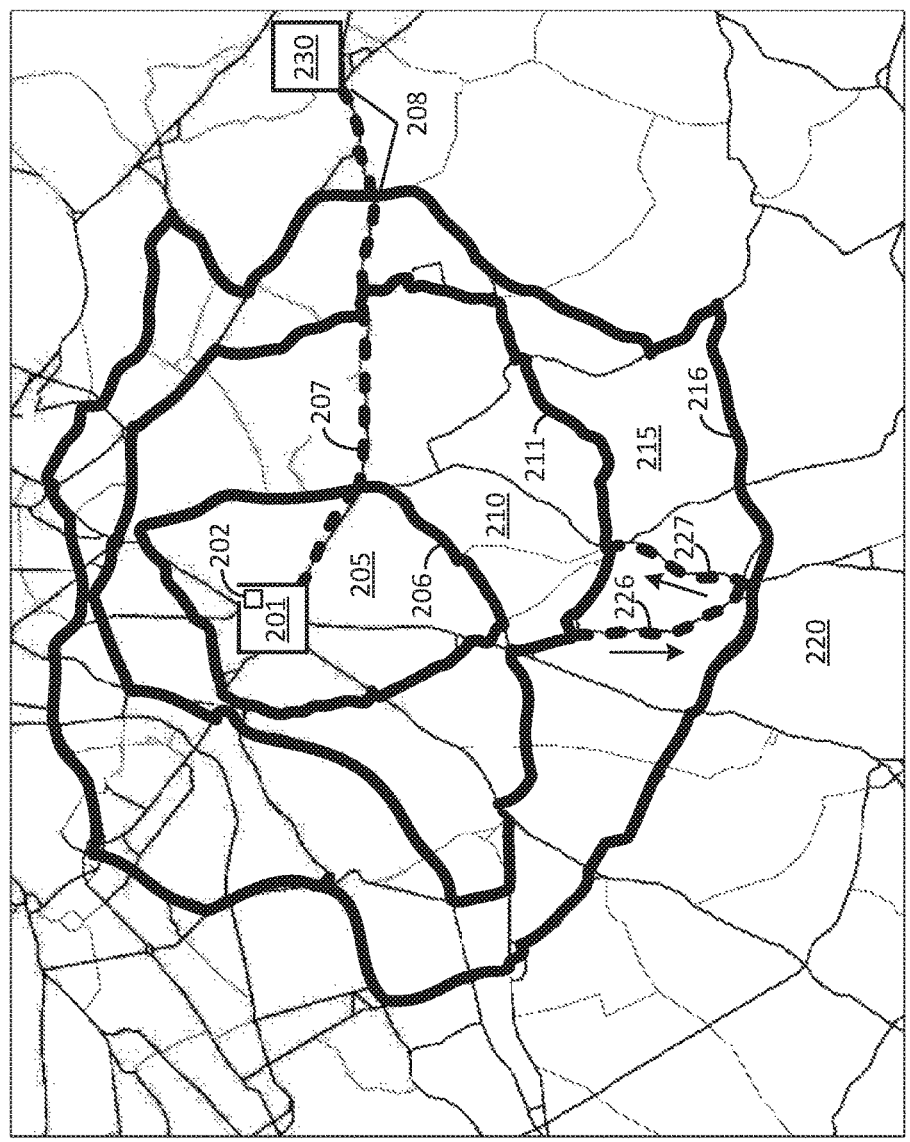
FIG. 2 illustrates a second key-free vehicle operations management system in accordance with an example embodiment of the disclosure.

FIG. 2 illustrates a second key-free vehicle operations management system 200 in accordance with an example embodiment of the disclosure. In this example embodiment, a multi-zone geofence having three zones is provided on an island having a tourist resort. A first zone 205 of the multi-zone geofence may be defined by a boundary 206 that encircles a main building 201 of the tourist resort. A second zone 210 that surrounds the first zone 205 is demarcated by a boundary 211. A third zone 215 that surrounds the second zone 210 is demarcated by a boundary 216. The tourist resort provides a fleet of vehicles that may be used by guests to drive around on the island.

The multi-zone geofence may be configured and operated by an onsite computer 202 located in the main building 201 (or at a remote location such as another island or a mainland). The boundary 206, the boundary 211, and the boundary 216 can be defined by the onsite computer 202 using GPS coordinates. The onsite computer 202 may further define and impose functional restrictions upon some or all of the fleet of vehicles provided by the tourist resort. The functional restrictions and other particulars pertaining to the multi-zone geofence may be communicated by the onsite computer 202 to onboard computers located in the vehicles and/or may be programmed directly into the onboard computers of the various vehicles.

In an example operating scenario, the onsite computer 202 may generate an inventory of all the vehicles in the fleet of vehicles; define the multi-zone geofence; and configure each of the inventoried vehicles to be operated key-free inside the multi-zone geofence. As a result, any guest can get into a vehicle and start the vehicle without using a traditional key or a PEPS device. This unfettered access and operability of the various vehicles can eliminate various error-prone, time-consuming, and expensive procedures associated with tasks such as issuing, inventorying, and keeping track of vehicle keys.

Key-free vehicle operations may be permitted inside the first zone 205 with no functional restrictions placed upon all vehicles that are offered to guests. Consequently, a guest can get into any one or more of such vehicles without using a conventional key or a PEPS device and drive around inside the first zone 205. Even though no functional restrictions have been placed upon the vehicles driven around inside the first zone 205, the tourist resort operators may choose to apply various speed limit rules inside certain areas of the first zone 125 for the protection of guests.

Key-free vehicle operations may also be permitted in the second zone 210 and the third zone 215. However, vehicles that are operated key-free inside the second zone 210 may be subjected to a first set of functional restrictions and vehicles that are operated key-free inside the third zone 215 may be subjected to a second set of functional restrictions. For example, an onboard computer of each of these vehicles may be configured to automatically impose a first speed limit upon a vehicle when the vehicle is traveling in the second zone 210, and a second speed limit when the vehicle is traveling in the third zone 215. In an example implementation, the first speed limit is a fixed speed limit, such as, for example, 30 mph. A guest who is operating a vehicle in the second zone 210 can drive around in the second zone 210 and the onboard computer automatically ensures that the vehicle does not exceed the first speed limit. The guest can exit the vehicle and re-enter the vehicle at a later time without the need for a key or a PEPS device.

The second speed limit that is applicable in the third zone 215 may be directional in nature and may be referred to as a vector of driver intent. The directional nature of the second speed limit may be described with reference to a first travel path 226 of a vehicle that is moving towards the boundary 216 of the third zone 215. The onboard computer of the vehicle can detect the location and direction of movement of the vehicle by using various vehicle sensors. Driving characteristics may be detected by monitoring driving characteristics such as, for example, a steering wheel angle, a gear selection (forward, reverse, low, high etc.), power, speed, and/or acceleration. In one case, a driving direction may be verified by detecting an angle of approach of the vehicle towards the boundary 216. Control of the engine may be proportionally transferred by the onboard computer to the customer based on the driving characteristics.

If found unacceptable, a warning may then be issued (for example, an audio message via an infotainment system of the vehicle) advising the guest to turn the vehicle around and head back towards the second zone 210. The onboard computer may automatically bring the vehicle to a halt if the guest decides to drive the vehicle across the boundary 216 and into an outside zone 220. The onboard computer may also disable key-free operations upon the vehicle when the vehicle is in the outside zone 220. When key-free operations are disabled, the guest may have to call resort staff to come by and start the vehicle or provide a one-time limited drive authorization to allow them to return inside the geofence. The remote one-time authorization may be time-bound and/or distance-bound.

On the other hand, the guest may heed the warning issued by the onboard computer and turn the vehicle around or reverse course prior to reaching the boundary 216 of the third zone 215. The onboard computer then cancels the speed slowdown action and permits the vehicle to move along the second travel path 227 at any speed below the functional speed restriction applicable in the third zone 215.

The key-free vehicle operations management system 200 may also provide for one or more emergency driving routes that allow a driver to use key-free operations and drive out of the multi-zone geofence without functional restrictions being applied. In some implementations in accordance with the disclosure, one or more of the emergency driving routes may be a pre-defined emergency driving route over certain roads and driving surfaces. In some other implementations, an onboard computer of a vehicle may dynamically configure an emergency driving route based on a current location of a vehicle and a nearest destination such as a hospital or an emergency response facility.

In an example situation, a guest may encounter a medical emergency when driving around in a vehicle near the main building 201. For example, a child who is a passenger in the vehicle may have fallen sick. Rather than wait for an ambulance, the guest may desire to rush the child to a hospital 230 that is located outside the multi-zone geofence. In such an example situation, the guest may call an emergency number operated by the resort authorities (or other authorities such as staff in the hospital 230 or 911 emergency call responders) to explain the emergency. The onboard computer in the vehicle may detect one or more of various trigger words (such as, for example, "help," "police," and/or "emergency") that may be used by the guest during the telephone call and responds by wirelessly communicating with the onsite computer 202 to configure an emergency driving route 207 from where the vehicle is located near the main building 201 to the hospital 230. Alternatively, the onboard computer in the vehicle can detect that guest has activated an emergency button or emergency switch provided in the vehicle and respond to the activation by wirelessly communicating with the onsite computer 202 to configure the emergency driving route 207.

At least some sections of the emergency driving route 207 may be pre-defined in some cases (certain highways, for example) or may be dynamically determined by the onsite computer 202 based on a current location of the vehicle and a nearest facility that can respond to the emergency. Further, the vehicle may be always allowed to travel on one or more emergency routes in order to address emergencies. Certain restriction such as, for example, a speed limit may be raised or lifted when the vehicle is traveling on the emergency route.

Upon receiving confirmation from the onsite computer 202 that the emergency driving route 207 is available for travel, the onboard computer in the vehicle may provide visual and/or audible guidance to assist the guest drive to the hospital 230. For example, visual and/or audible instructions may be provided via an infotainment system in the vehicle in a manner similar to that provided by a GPS navigation system. The functional restrictions that are normally applied to the vehicle when traveling in the various zones of the multi-zone geofence can be lifted when the vehicle is traveling on the emergency driving route 207. Thus, for example, the vehicle can be driven at a higher speed with no automatic slow down being applied in the second zone 210 or the third zone 215. Furthermore, key-free operations that are normally not allowed outside the third zone 215 may be enabled on a section 208 of the emergency driving route 207 to permit the guest drive to the hospital 230 without hindrance. As a result, the guest can concentrate on getting medical assistance for the child at the hospital 230. In some cases, in lieu of enabling key-free operations on the section 208 of the emergency driving route 207, the onsite computer 202 may provide to the driver (via a smartphone, for example), an electronic key and/or PEPS operability to allow the driver to carry out various actions upon the vehicle such as starting, stopping, locking doors, and unlocking doors.

The onsite computer 202 located in the main building 201 may set a time limit for use of the emergency driving route 207. Upon expiry of the time limit, the emergency driving route 207 is automatically eliminated and the functional restrictions and conditions applicable to the various zones of the multi-zone geofence are reinstated. The time limit feature can prevent misuse of the emergency driving route 207 by other vehicles.

The onsite computer 202 located in the main building 201 may set a time limit and lift all functional restrictions on some or all of the fleet of vehicles so as to allow multiple vehicles to travel out of the multi-zone geofence during certain types of emergencies such as, for example, during an occurrence of a fire or a natural disaster. The fleet of vehicles can thus be used for mass scale evacuation of guests during such emergencies, without encountering limitations such as the directional speed feature in the third zone 215. Upon expiry of the time limit, some or all of the functional restrictions and conditions that were applicable to the various zones of the multi-zone geofence may be automatically reinstated.

Figure 3:
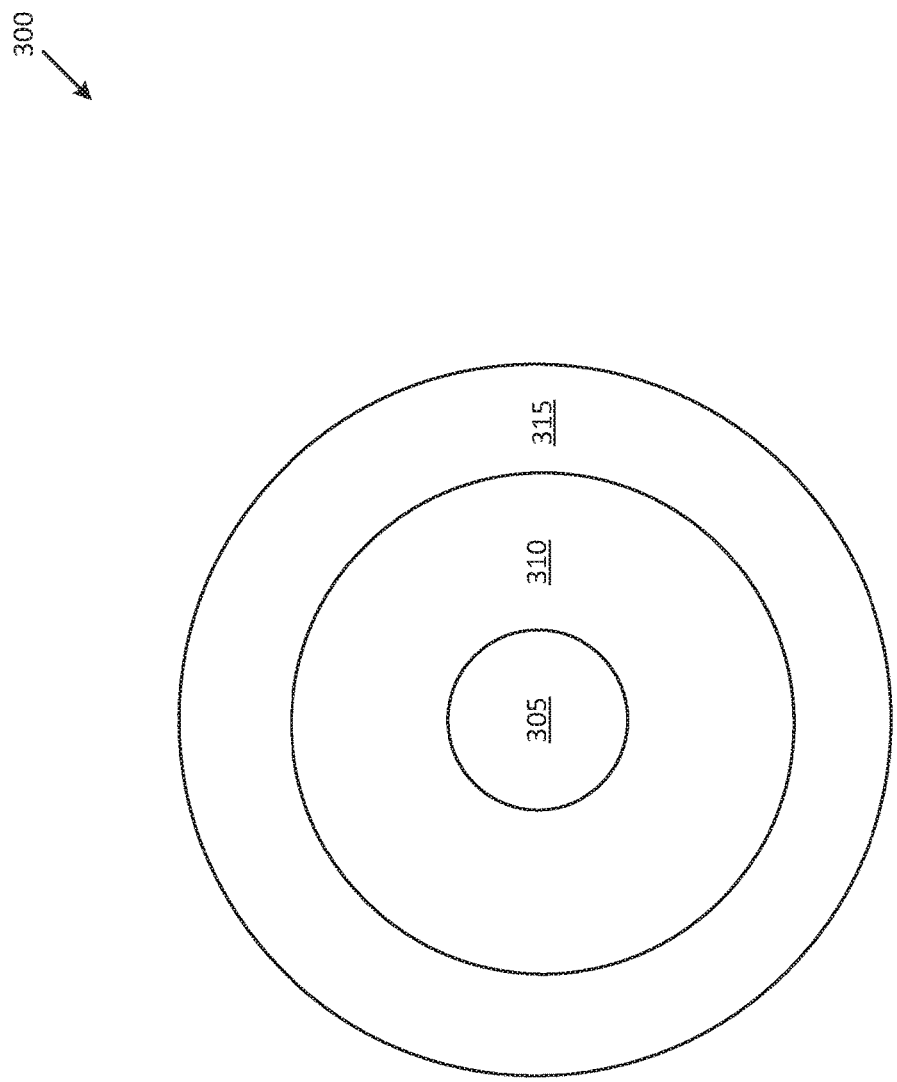
FIG. 3 shows a symbolic representation of a first multi-zone geofence that can be used for key-free vehicle operations management system in accordance with the disclosure.

FIG. 3 shows a symbolic representation of an example multi-zone geofence 300 that can be used for key-free vehicle operations management system in accordance with the disclosure. In this example configuration, the multi-zone geofence 300 includes three zones. In other configurations, two zones, or more than three zones, may be included in a multi-zone geofence in accordance with the disclosure. The three zones of the multi-zone geofence 300 include a central zone 305, an intermediate zone 310, and an outer zone 315.

In a first example implementation of the multi-zone geofence 300, some or all of the features of the central zone 305 may be substantially similar to the features of the first zone 125 that is described above with reference to FIG. 1 and/or to the first zone 205 that is described above with reference to FIG. 2. Some or all of the features of the intermediate zone 310 may be substantially similar to the features of the second zone 210 that is described above with reference to FIG. 2. Some or all of the features of the outer zone 315 may be substantially similar to the features of the second zone 165 that is described above with reference to FIG. 1 and/or to the third zone 215 that is described above with reference to FIG. 2.

In a second example implementation of the multi-zone geofence 300, the central zone 305, the intermediate zone 310, and/or the outer zone 315 can include additional features or variants of the features described above. For example, the intermediate zone 310 can include a directional speed feature that automatically reduces a speed of a vehicle traveling from the intermediate zone 310 into the outer zone 315. The speed may be further reduced when the vehicle is traveling in the outer zone 315 towards a periphery of the multi-zone geofence 300. The lowered speed may be lifted when the vehicle turns around in the intermediate zone 310 or in the outer zone 315 and travels towards the central zone 305.

In a third example implementation of the multi-zone geofence 300, key-free operations may be enabled inside the multi-zone geofence 300 over a first period of time, such as during a part of a day (forenoon, for example) or a part of a week (weekdays, for example). Key-free operations may be disabled over a second period of time such as during another part of the day (night, for example) or another part of the week (weekend, for example). In some cases, the multi-zone geofence 300 may be modified during the first period of time and/or during the second period of time. For example, the multi-zone geofence 300 may be dynamically modified over a short period of time when key-free operations have been enabled inside the multi-zone geofence 300. The multi-zone geofence 300 may be modified over a relatively longer period of time when key-free operations have been disabled inside the multi-zone geofence 300.

The multi-zone geofence 300 may also be configured to include one or more emergency driving routes that are described above. The emergency driving routes may originate from any of the three zones and terminate at various locations inside the multi-zone geofence 300 or outside the multi-zone geofence 300. For example, an emergency driving route may be provided from a location in the intermediate zone 310 where an emergency situation has arisen, to an emergency facility located outside the multi-zone geofence 300. In another example, an emergency driving route may be provided from a location in the central zone 305 where an emergency situation has arisen, to an emergency facility located in the outer zone 315 (or the intermediate zone 310). In yet another example, an emergency driving route may be provided from a location in one zone to another location inside the same zone.

The multi-zone geofence 300 may also be configured to disable key-free operations of a vehicle under certain conditions. For example, key-free operations of a vehicle in one of the zones of the multi-zone geofence 300 may be disabled when the vehicle has a malfunction. A mechanic may wish to require keys to be able to control access and starting of the vehicle while carrying out repairs. As another example, key-free operations of a vehicle exiting a periphery of the multi-zone geofence 300 may be disabled in order to prevent theft of the vehicle. In some cases, a vehicle exiting a periphery of the multi-zone geofence 300 may be disabled in a manner that not only prevents key-free operations but also prevents the vehicle from being started using a key fob or PEPS device. An authorized person, such as a staff member of an automobile dealership or a repair technician, may start the vehicle by inserting a key into the ignition lock of the vehicle.

Figure 4:
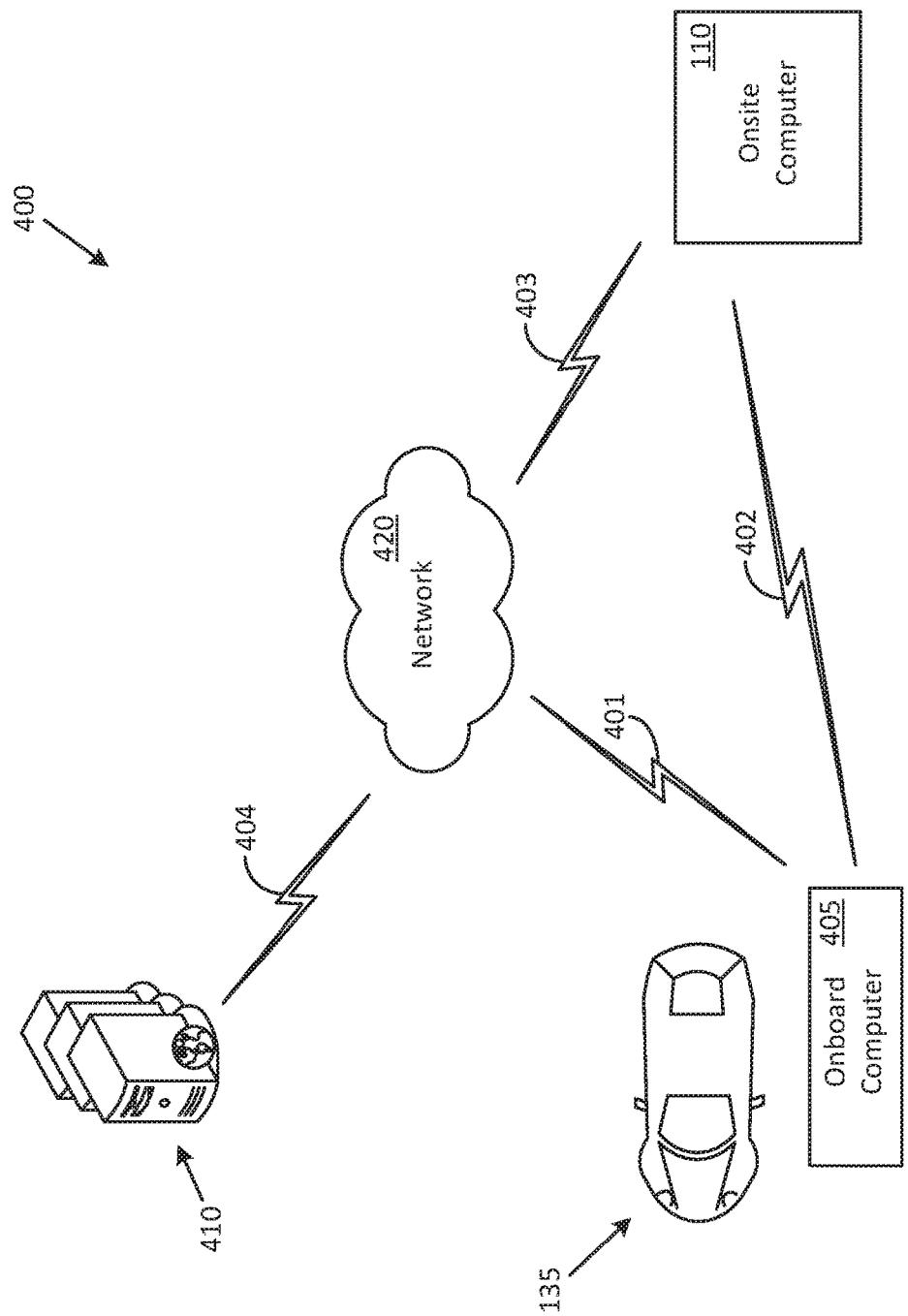
FIG. 4 illustrates a first example computer network for operating a key-free vehicle operations management system in accordance with an example embodiment of the disclosure.

FIG. 4 illustrates an example computer network 400 for operating a key-free vehicle operations management system in accordance with a first example embodiment of the disclosure. Computer network 400 can include an onboard computer 405 that may be located in the vehicle 135 described above. The onboard computer 405 can be communicatively coupled via a wireless communication link 402 to the onsite computer 110 described above, and via a wireless communication link 401 to a network 420. The onsite computer 110 may be communicatively coupled to the network 420 via a wireless communication link 403 or through any other communication medium (wired communication link, fiber optic link, etc.). A server computer 410 that may be housed at a remote location may be communicatively coupled to the network 420 via a wireless communication link 404 or through any other communication medium (wired communication link, fiber optic link, etc.).

The network 420 may include any one, or a combination of networks, such as a local area network (LAN), a wide area network (WAN), a telephone network, a cellular network, a cable network, a wireless network, and/or private/public networks such as the Internet. For example, the network 420 may support communication technologies such as TCP/IP, Bluetooth, cellular, Ultra-Wide-band (UWB), near-field communication (NFC), Wi-Fi, Wi-Fi direct, machine-to-machine communication, and/or man-to-machine communication.

Some or all portions of the wireless communication link 402 that supports communications between the onboard computer 405 and the onsite computer 110 may be implemented using various types of wireless technologies such as Bluetooth®, ZigBee®, UWB, or near-field-communications (NFC), cellular, Wi-Fi, Wi-Fi direct, machine-to-machine communication, man-to-machine communication, and/or a vehicle-to-everything (V2X) communication. The wireless communication link 401 that supports communications between the onboard computer 405 and the network 420 may include one or more of the various types of wireless technologies used for communications over the wireless communication link 402.

In at least some implementations, the onboard computer 405 may cooperate with the onsite computer 110 and/or the server computer 410 to perform various operations associated with a key-free vehicle operations management system that uses a multi-zone geofence in accordance with the disclosure. The operations can include defining the multi-zone geofence, enforcing the various functional restrictions, and providing features such as directional speed variation and emergency driving routes.

Figure 5:
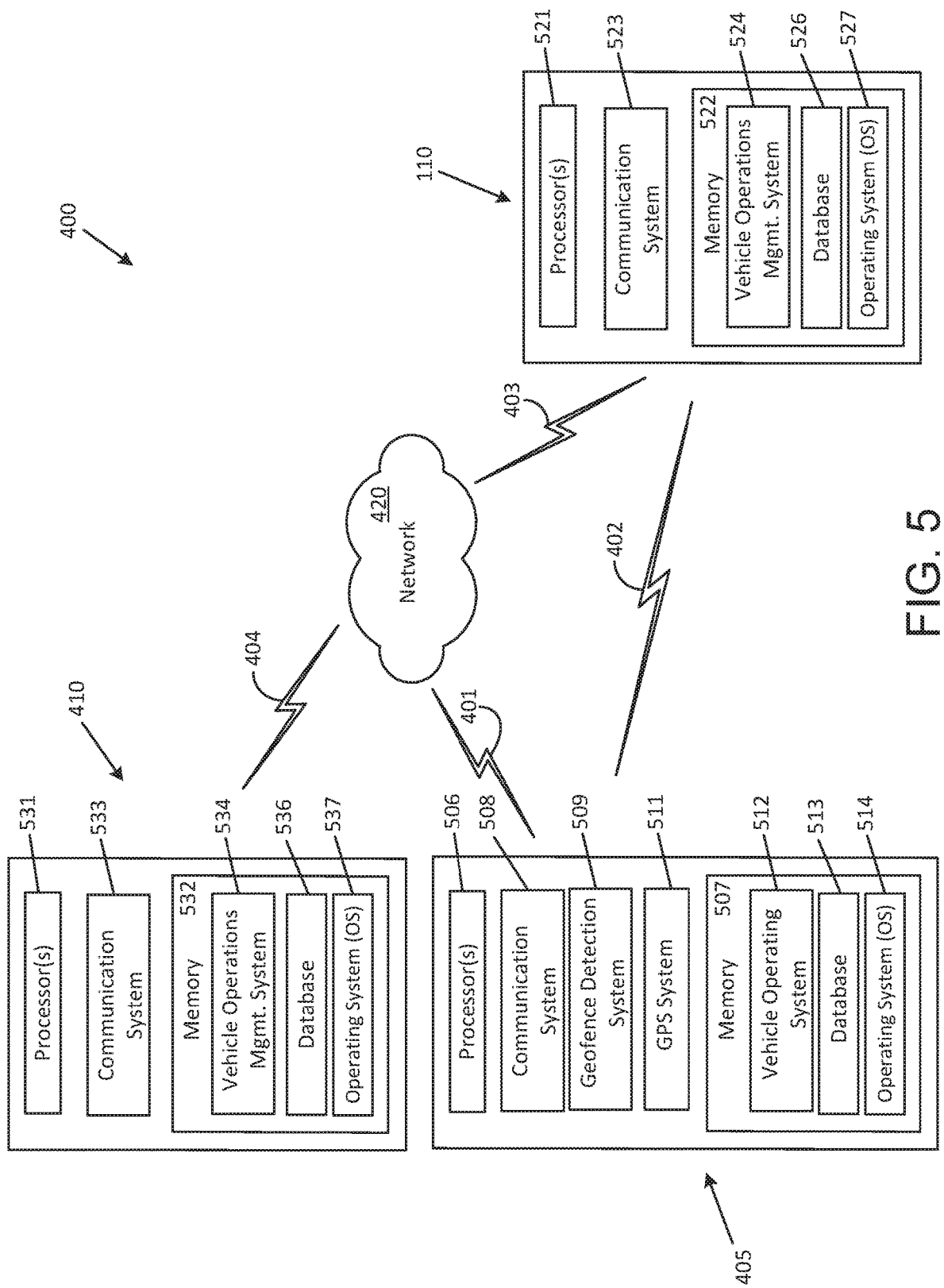
FIG. 5 shows some example components that may be included in various computers in the network configuration shown in FIG. 4.

FIG. 5 shows some example components that may be included in the various computers of the computer network 400 shown in FIG. 4. In this example configuration, the onboard computer 405 may include a processor 506, a communication system 508, a GPS system 511, and a memory 507. The communication system 508 can include a transceiver that allows the onboard computer 405 to communicate with various components such as the onsite computer 110 and the server computer 410 (via the network 420).

Communications between the onboard computer 405 and various components in the vehicle 135 in which the onboard computer 405 may be located can be carried out over a bus (not shown). The bus can be implemented using one or more of various wired and/or wireless technologies. For example, the bus can be a vehicle bus that uses a controller area network (CAN) bus protocol, a Media Oriented Systems Transport (MOST) bus protocol, and/or a CAN flexible data (CAN-FD) bus protocol.

Some or all portions of the bus may also be implemented using wireless technologies such as Bluetooth®, ZigBee®, UWB, or near-field-communications (NFC), cellular, Wi-Fi, Wi-Fi direct, machine-to-machine communication, and/or man-to-machine communication to communicate with devices such as an infotainment system in the vehicle 135. At least some of the information generated by the onboard computer 405 in accordance with the disclosure, such as an alert message or a warning message, may be wirelessly transmitted by the communication system 508 to the infotainment system in the vehicle.

The communication system 508 may communicate with the onsite computer 110 by using the wireless communication link 402 and with various components of the network 420 by using the wireless communication link 401. The geofence detection system 509 may cooperate with the GPS system 511 for detecting various features related to a multi-zone geofence. For example, the geofence detection system 509 may cooperate with the GPS system 511 for detecting the boundary 206, the boundary 211, and/or the boundary 216 of the multi-zone geofence shown in FIG. 2. In some example implementations, the geofence detection system 509 can use other techniques to identify one or more boundaries of a multi-zone geofence, such as, for example, dead reckoning techniques, image processing techniques (by identifying landmarks), or manual input from a driver of the vehicle 135.

The memory 507, which is one example of a non-transitory computer-readable medium, may be used to store an operating system (OS) 514 and one or more code modules such as a vehicle operating system 512. The code modules can be provided in the form of computer-executable instructions that are executed by the processor 506 for performing various operations in accordance with the disclosure. The memory 507 may also include a database 513 that can be used to store information such as, for example, restrictions associated with various zones of a multi-zone geofence.

The processor 506 can execute the vehicle operating system 512 to perform various actions, such as, for example, identifying various characteristics of a multi-zone geofence, enabling key-free operations in one or more zones of the multi-zone geofence, enforcing functional restrictions (such as automatic speed control), enforcing a directional speed feature in one or more zones of the multi-zone geofence, provisioning an emergency driving route, and providing instructions to a driver of the vehicle for traveling along the emergency driving route. Some of these actions, such as speed control, for example, may be carried out by the processor 506 executing the vehicle operating system 512 in cooperation with a processor of an engine controller module (not shown) of the vehicle.

The onsite computer 110 may include a processor 521, a communication system 523, and a memory 522. The communication system 523 can include a transceiver that allows the onsite computer 110 to communicate with the onboard computer 405 in the vehicle 135 and the server computer 410 (via the network 420). The memory 522, which is another example of a non-transitory computer-readable medium, may be used to store an operating system (OS) 527 and one or more code modules such as a vehicle operations management system 524. The code modules can be provided in the form of computer-executable instructions that are executed by the processor 521 for performing various operations in accordance with the disclosure. The memory 522 may also include a database 526 that can be used to store information such as, for example, restrictions associated with various zones of a multi-zone geofence.

The processor 521 can execute the vehicle operations management system 524 to perform various actions, such as, for example, defining a multi-zone geofence, determining functional restrictions for various zones of the multi-zone geofence, inventory management for the various vehicles being operated inside the multi-zone geofence (such as the fleet of vehicles operated inside the multi-zone geofence of the key-free vehicle operations management system 200 described above), authorizing unrestricted key-free operations in all zones for designated individuals (for example, sales staff, customers, etc.), keeping track of key-free operated vehicles moving around inside the multi-zone geofence, and communicating data and information, such as boundary information and functional restrictions, associated with the multi-zone geofence to the onboard computer 405 of the vehicle. The processor 521 can execute the vehicle operations management system 524 to perform various actions, such as, for example, eliminating a multi-zone geofence, dynamically modifying an existing multi-zone geofence, and provisioning an emergency driving route.

The server computer 410 may include a processor 531, a communication system 533, and a memory 532. The communication system 533 can include a transceiver that allows the server computer 410 to communicate with the onboard computer 405 in the vehicle 135 (via the network 420) and the onsite computer 110 (via the network 420). The memory 532, which is yet another example of a non-transitory computer-readable medium, may be used to store an operating system (OS) 537 and one or more code modules such as a vehicle operations management system 534. The code modules can be provided in the form of computer-executable instructions that are executed by the processor 531 for performing various operations in accordance with the disclosure. The memory 532 may also include a database 536 that can be used to store information such as, for example, restrictions associated with various zones of a multi-zone geofence.

The processor 531 can execute the vehicle operations management system 534 to perform various actions, that may be similar to, or variants of, the actions carried out by the processor 521 by executing the vehicle operations management system 524 in the onsite computer 110. In some example implementations, the server computer 410 may cooperate with the onsite computer 110 to share the execution of some tasks associated with a key-free vehicle operations management system that uses a multi-zone geofence in accordance with the disclosure.

Figure 6:
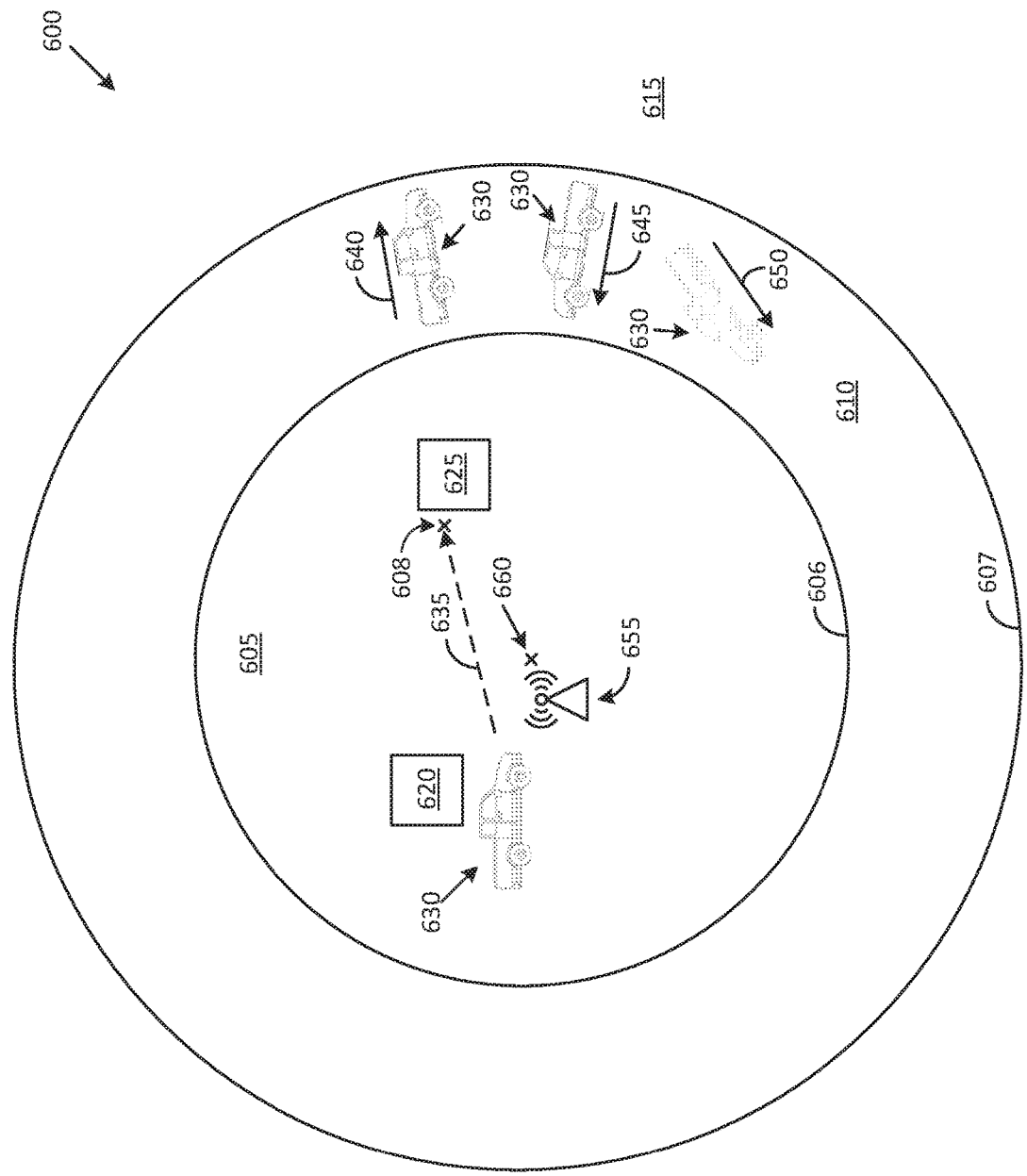
FIG. 6 shows a symbolic representation of a second multi-zone geofence that can be used for key-free vehicle operations management system in accordance with the disclosure.

FIG. 6 shows a symbolic representation of an example multi-zone geofence that can be used for key-free vehicle operations management system 600 in accordance with another embodiment of the disclosure. In one example implementation of this embodiment, the multi-zone geofence includes two zones—a first zone 605 and a second zone 610. In other implementations, more than two zones can be provided in the multi-zone geofence.

The first zone 605 of the multi-zone geofence is a central zone that is demarcated by a boundary 606. The second zone 610 surrounds the first zone 605 and is demarcated by a boundary 607. Each of the first zone 605 and the second zone 610 has a circular shape. However, in other implementations, one or both of the first zone 605 and the second zone 610 can have a different shape (square, polygonal, oval, irregular, etc.). In one example scenario, the key-free vehicle operations management system 600 is deployed at a work site. In other scenarios, the key-free vehicle operations management system 600 can be deployed in other environments where one or more vehicles may be used for various purposes. Some example environments may include a camping area, a tailgate party area, and an accident site where multiple police vehicles may be present. At least some of the police vehicles at the accident site may be left unattended and susceptible to theft if no preventive measures are taken such as those offered by a multi-zone geofence in accordance with disclosure.

In the illustration shown in FIG. 6, the boundary 606 of the first zone 605 may be defined to coincide with a work site, and the boundary 607 of the second zone 610 may be defined to include one or more roads that lead from the work site to public access areas such as public roads and highways. One or more contractors may employ workers that use work vehicles having various types of construction equipment such as joists, drills, and jacks, for performing various tasks at the work site. In an example case, the contractors may employ a work shift procedure in order to avoid the vehicles being left unused at times. The work shift procedure can ensure that some or all of the vehicles are operated by various drivers based on the work shift timings.

However, in one example situation, a first worker who is getting off a work shift may not like to wait for a tardy second worker, to personally hand over the keys of a vehicle, so as to avoid risks associated with leaving the vehicle unattended with the key in the ignition lock. In another example situation, the first worker may be on a coffee break during his/her work shift and the second worker may wish to move the vehicle from one location to another inside the work site. The first worker may have carried with him the key to the vehicle when going on his/her coffee break. The second worker now has to either locate the first worker and fetch the key or waste time waiting for the first worker to return to the vehicle.

In view of such situations, it may be desirable to allow workers to drive work vehicles around the work site without the need to use keys or PEPS devices. However, allowing workers to drive the work vehicles without using keys or PEPS devices introduces the risk of having vehicles stolen or misused. For example, a reckless worker may drive a work vehicle that he/she is unfamiliar with at a dangerous speed and/or may make use of equipment provided in the vehicle in an improper and dangerous manner.

The multi-zone geofence offers a solution to address such issues by allowing the workers to use the vehicles at the work site without keys or PEPS devices. A key-free vehicle operations management system in accordance with the disclosure provides for the application of various types of functional restrictions upon one or more vehicles operated inside the multi-zone geofence.

In one example implementation, the multi-zone geofence may be configured and operated by a work site computer such as the onsite computer 110 described above. The onsite computer 110 may also be used to define and enforce operating conditions and functional restrictions upon multiple vehicles operated at the work site. A few examples of operating conditions can include driving functionalities (start engine, drive, brake, accelerate etc.) as well as control of various devices and objects in the vehicle (infotainment system, climate control, etc.).

In another example implementation, the multi-zone geofence may be configured and operated by an onboard computer located in a vehicle such as the onboard computer 405 described above. When configured and operated by the onboard computer, the multi-zone geofence may be dynamically defined with respect to a specific location associated with the vehicle having the onboard computer. The specific location can be, for example, a parking spot where the vehicle is parked overnight. The onboard computer may be further used to define and enforce operating conditions and functional restrictions upon the vehicle having the onboard computer. Consequently, in this example implementation, each of one or more vehicles in the work site may have an associated multi-zone geofence that is uniquely associated with the vehicle. In one example scenario, a vehicle may define a multi-zone geofence by identifying the boundary 606 and the boundary 607 via a learning procedure. The learning procedure may involve the vehicle being driven along a perimeter of the work site in order for the onboard computer to determine a definition of the boundary 606 and/or the boundary 607.

In yet another example implementation, the multi-zone geofence can be defined by employing one or more transponders. In one example scenario, a transponder 655 may be placed at a location 660. The transponder 655 may include a communication system that communicates with various onboard computers provided in various vehicles. The communication system can use any of various types of communication technologies such as vehicle-to-infrastructure (V2I) communications, for example. Communications with the transponder 655 permit a vehicle inside the multi-zone geofence, such as the vehicle 630, to obtain various types of information about the multi-zone geofence. The information can include, for example, the perimeter of each of the various zones (any shape—circular, oval, rectangular, polygonal, etc.) and restrictions associated with one or more of the zones. The communications may also permit the transponder 655 to send control/command signals to the onboard computer in the vehicle 630 to ensure that the vehicle 630 complies with the various restrictions and rules applicable to the multi-zone geofence.

GPS techniques may be used in this application, by the transponder 655, for defining the boundaries of the multi-zone geofence. GPS techniques may also be use by the vehicle 630 to identify the perimeter of each of the various zones. The shape and size of the various zones may be dynamically modified by the transponder 655 in some implementations. In some implementations, more than one transponder may be employed. For example, four transponders may be placed at four corners of a rectangular-shaped zone for defining the perimeter of a zone of a geofence.

In another example scenario, the onboard computer provided in the vehicle 630 may be configured to define the multi-zone geofence. This operation may be carried out by using vehicle-to-vehicle (V2V) communications to convey information about the multi-zone geofence to other vehicles that may be present in the vicinity of the vehicle 630. The multi-zone geofence in this case moves along with the vehicle 630, which can be, for example, a heavy-duty industrial machine (a crane or an earth mover, for example) that may pose a hazard to other vehicles. The onboard computer in the vehicle 630 may initiate the generation of the multi-zone geofence at various times and under various conditions such as, for example, when a key is removed from the ignition lock of the vehicle 630, when a valet is employed to park the vehicle 630, or when initiated by an occupant of the vehicle 630. In some cases, various authorization techniques such as facial recognition, fingerprint recognition, and/or code entry, may be used before allowing the occupant of the vehicle 630 (a driver, for example) to generate the multi-zone geofence.

In yet another example scenario, a computer located at a remote location may be used to define and/or operate the multi-zone geofence. This computer may communicate with the onboard computers of various vehicles such as the vehicle 630, to inform and to enforce operations related to the multi-zone geofence.

Key-free vehicle operations may be permitted inside the first zone 605 with a first set of functional restrictions and inside the second zone 610 with a second set of functional restrictions. In an example implementation, the first and/or second set of functional restrictions may be selectively enabled or disabled by a specific individual, such as, for example a designated driver of the vehicle or a work supervisor. The enabling and disabling may be carried out by using various devices such as, for example, a smartphone or a laptop of the work supervisor. In some cases, the work supervisor can monitor usage of the vehicle by using the smartphone, which may be coupled to a GPS device or a camera provided in the vehicle.

A few examples of the first set of functional restrictions that may be applied in the first zone 605 can include a speed restriction, an amount of torque provided by an engine of a vehicle, and/or a gear shift limitation. The speed restriction prevents the vehicle from being driven at dangerous speeds inside the first zone 605. Limiting the amount of torque can be used to prevent misuse and/or mishandling of certain types of equipment provided in the vehicle. The gear shift limitation can be used to prevent a gear shifter of the vehicle from being moved from a lower gear to a higher gear for driving the vehicle at high speed, or software limitations on available transmission gears, such as forcing higher gear starts. In the example illustration, the vehicle 630 can move from a work spot 620 to another work spot 625 inside the first zone 605 with the first set of functional restrictions applied to the vehicle 630. The vehicle 630 may follow a straight-line path 635 when traveling from the work spot 620 to a location 608 near the work spot 625.

Key-free vehicle operations may be permitted in the second zone 610 subject to the second set of functional restrictions. The second set of functional restrictions can include the first set of restrictions in identical or modified form and may further include additional restrictions. A few examples of modifications upon the first set of restrictions may include a lowering of a speed threshold of the speed restriction applicable in the first zone 605 and/or a further reduction in the number of gears that are operable through use of the gear shifter or software controls. A few examples of additional restrictions that may be applied inside the first zone 605 can include the directional speed reduction feature and other restrictions described above with respect to the second zone 165 illustrated in FIG. 1 (and the second zone 210 illustrated in FIG. 2). Various aspects of the area 615 outside the multi-zone geofence can be substantially similar to, or identical to, those described above with respect to the outside zone 220 illustrated in FIG. 2.

In some cases, directional speed restriction in the second zone 165 may be enforced at various operational levels depending on an angular direction of travel of the vehicle 630. For example, a first speed reduction procedure may be automatically imposed upon the vehicle 630 when the vehicle 630 is traveling towards the boundary 607 in a radial direction 640 inside the second zone 610. The first speed reduction feature may be applied in a gradual manner so as to avoid abruptly halting the vehicle 630 at the boundary 607 and risking a traffic accident. If the vehicle 630 is turned around at the boundary 607 and travels towards the boundary 606 in a radial direction 645, the speed reduction is lifted at a rate that is faster than if the vehicle 630 is turned around at the boundary 607 and travels towards the boundary 606 in an angular direction 650. The onboard computer may disable key-free operations when the vehicle travels outside the multi-zone geofence.

Figure 7:
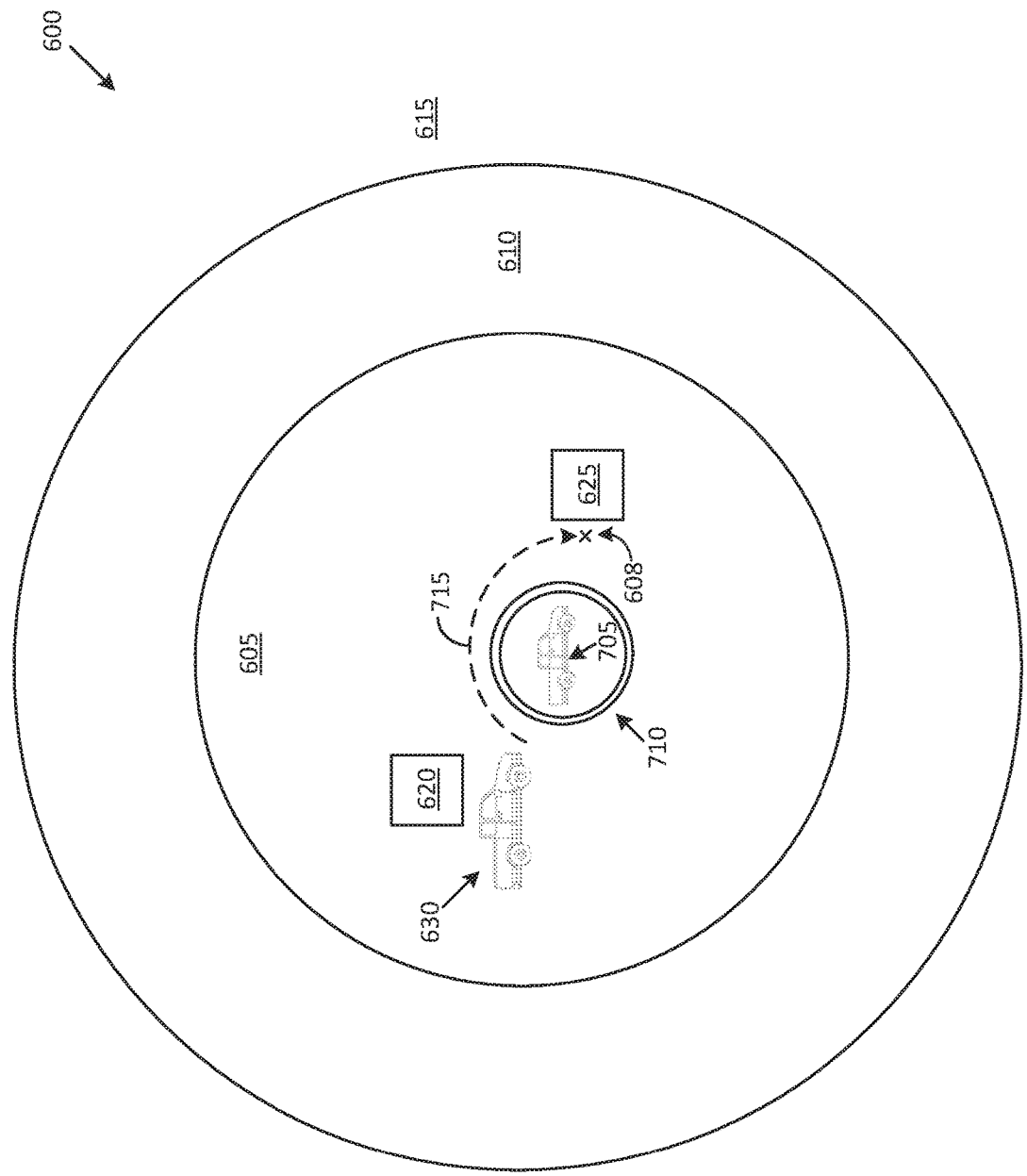
FIG. 7 illustrates a functional restriction that may be applicable in the second multi-zone geofence shown in FIG. 6.

FIG. 7 illustrates an example functional restriction that may be applied to key-free vehicle operations management system 600 upon a vehicle traveling in the first zone 605 of the multi-zone geofence and may be applied to one or more other zones of a multi-zone geofence as well. The functional restriction may be typically used when one or more geofences are located inside a geofence. These additional geofences, which can be referred to as "secondary" geofences (because of being located inside a "primary" geofence), can be single zone or multi-zone geofences.

In one example implementation, a secondary geofence can have functional restrictions and conditions that are independent of functional restrictions and conditions applicable to the primary geofence. In another example implementation, a secondary geofence can include the functional restrictions and conditions applied to the primary geofence (in identical or modified form) and can also include additional restrictions and conditions.

If no secondary geofence is present, the vehicle 630 can follow the straight-line path 635 when traveling from the work spot 620 to the location 608 near the work spot 625 as described above. However, if a secondary geofence 710 is present inside the primary geofence, the vehicle 630 is automatically constrained to following a path, such as path 715, that avoids entering the secondary geofence 710. The key-free vehicle operations management system 100 automatically prevents the vehicle 630 from entering the secondary geofence 710 and can resist efforts by the driver of the vehicle 630 to do so (warning messages, engine disablement, restricting steering wheel operations, etc.).

The secondary geofence 710 may be defined in various ways, such as, by another vehicle 705. The vehicle 705 may, for example, have digging equipment that is being used to dig a large ditch. It is desirable in the interests of safety to prevent other vehicles, such as the vehicle 630, from coming close to the ditch.

Various other functional restrictions can be automatically applied by the key-free vehicle operations management system upon vehicles that are operated inside one or more zones of the primary geofence and/or inside one or more zones of the secondary geofence 710. Some example functional restrictions can include: restricting one or more operational features of a generator that is provided in a vehicle; restricting disabling of an idling condition of a vehicle (idling condition may be used to provide power and other services to auxiliary equipment such as a drill); restricting an amount of time allowed to run a vehicle in an idling mode; prevent movement of a vehicle if seatbelt(s) is not used; prevent certain window/door operations; prevent climate controls from being modified; inhibit/control operations associated with mechanical/electrical power take-off (PTO); and prevent switching off of one or more lights of a vehicle; lock an infotainment system of a vehicle.

Figure 8:
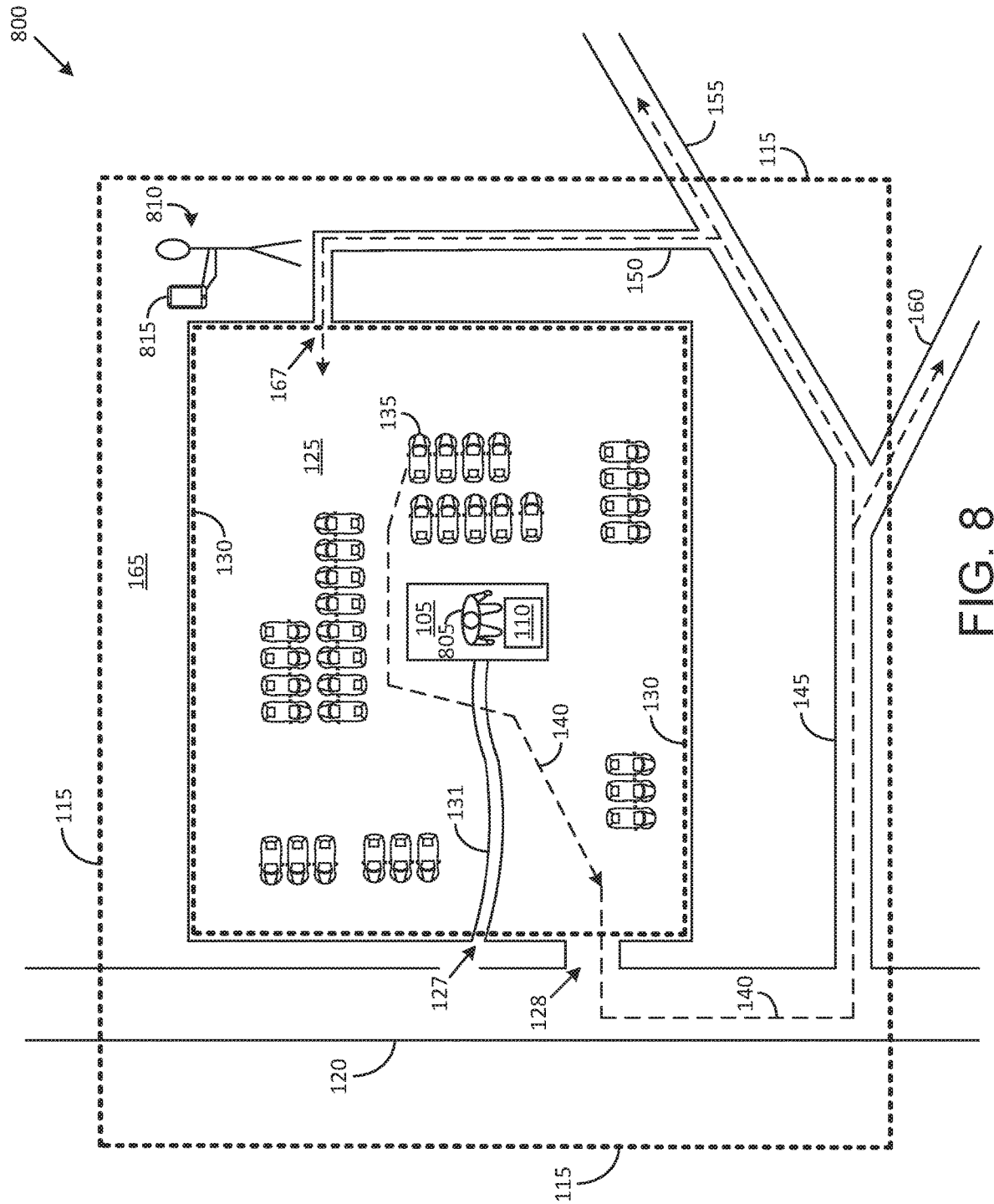
FIG. 8 illustrates a third key-free vehicle operations management system in accordance with an example embodiment of the disclosure.

FIG. 8 illustrates a key-free vehicle operations management system 800 in accordance with an example embodiment of the disclosure. In a first example implementation of this embodiment, the key-free vehicle operations management system 800 is deployed in the premises of the automobile dealership described above. In other implementations, the key-free vehicle operations management system 800 can be deployed in other environments where one or more vehicles may be used for various purposes, such as, for example, a car rental agency, a golf course, a tourist resort, an amusement park, a campus, a warehouse, a seaside dock, a manufacturing facility, or a communal living facility.

The key-free vehicle operations management system 800 includes the first zone 125 and the second zone 165 of the multi-zone geofence described above. The various operations described above with reference to the key-free vehicle operations management system 100 are generally applicable to the key-free vehicle operations management system 800 as well. An additional operation that may be carried out in the key-free vehicle operations management system 800 involves an individual 810 who is standing outside the first zone 125 (either inside the second zone 165 or outside the second zone 165) using a remote-control device 815 to control one or more operational aspects of vehicles located inside the multi-zone geofence. In some cases, the remote-control device 815 may be used to control operational aspects of vehicles that are located inside the first zone 125 but not of vehicles present in the second zone 125. The operational aspects can include, for example, unlocking/locking a door of the vehicle, starting/stopping of an engine of a vehicle, turning on/off an air conditioning system of the vehicle, and communicating with a customer via an infotainment system of a vehicle.

In one example implementation of this operation, the remote-control device 815 can be used to control operational aspects of one or more vehicles located inside the first zone 125 subject to receiving a vehicle-control enable signal from an entity located inside the first zone 125. The entity can be an individual (such as an individual 805 who operates the onsite computer 110) or an object (such as an onboard computer in the vehicle 135).

In another example implementation of this operation, the remote-control device 815 can be used to control operational aspects of one or more vehicles located inside the first zone 125 subject to receiving a vehicle-control enable signal from an entity located outside the multi-zone geofence, such as from a server computer located in a headquarters facility of the automobile dealership.

The remote-control device 815 can be any of various types of devices such as, for example, a smartphone that runs a software application for controlling certain operations of a vehicle located inside the multi-zone geofence, a fob that includes one or more keys that may be depressed for controlling certain operations of the vehicle, or a portable computer (a laptop or a tablet, for example) that runs a software application for controlling certain operations of a vehicle located inside the multi-zone geofence.

Figure 9:
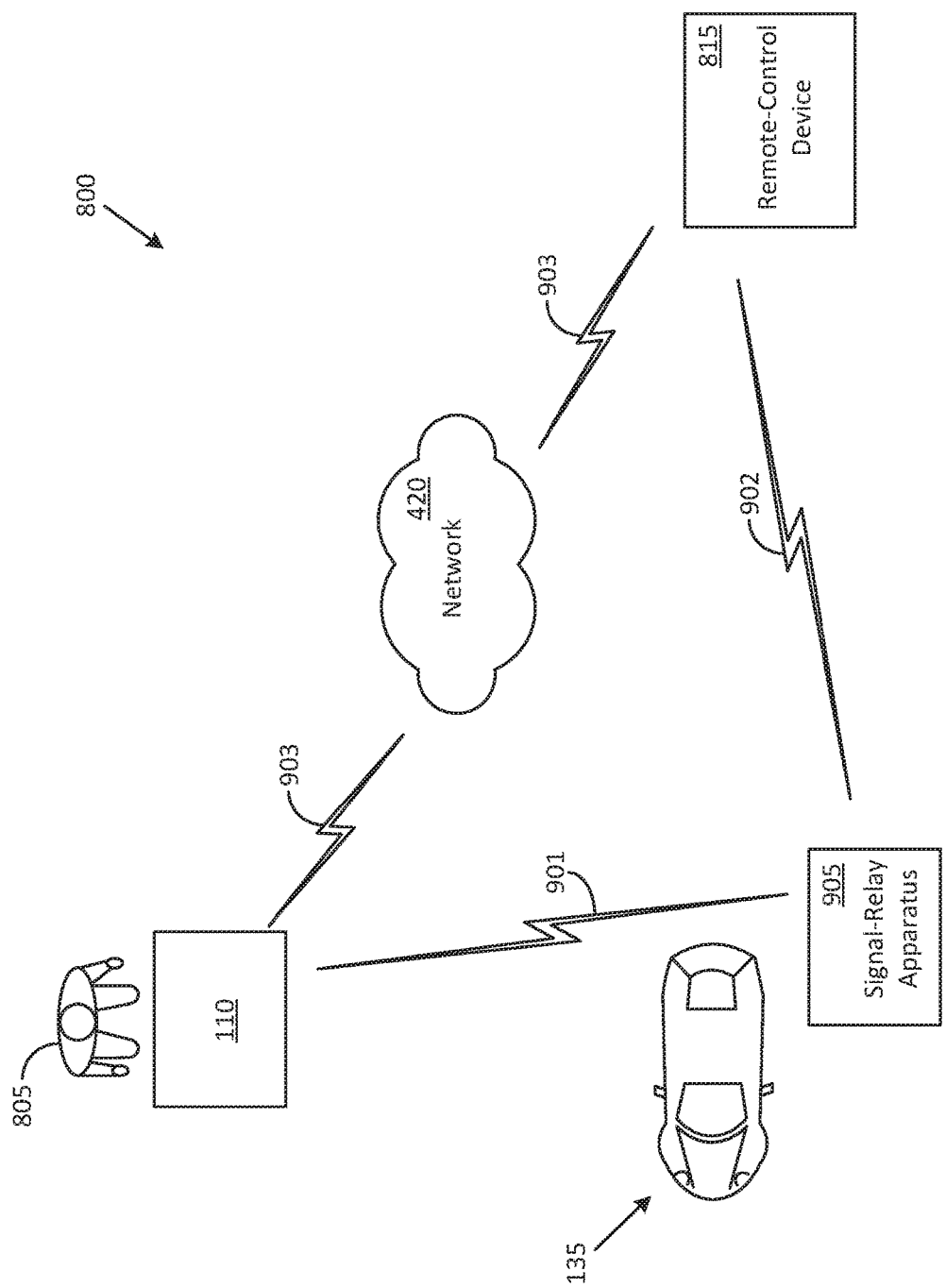
FIG. 9 illustrates some example components that can be included in the third key-free vehicle operations management system.

FIG. 9 illustrates some example components that can be included in the key-free vehicle operations management system 800. The individual 805, who may be a sales manager at the automobile dealership, for example, transmits a vehicle-control enable signal by using the onsite computer 110. In this example configuration, the vehicle-control enable signal can be propagated to the remote-control device 815 via one of two alternative signal paths. More particularly, in one case, the vehicle-control enable signal may be transmitted by use of a wireless signal 903 that is propagated through the network 420 (the Internet, for example) to the remote-control device 815. In a second case, the vehicle-control enable signal may be transmitted by use of a wireless signal 901 that is transmitted to a signal-relay apparatus 905 located in a vehicle (the vehicle 135, for example). The signal-relay apparatus 905, which may be a standalone unit or integrated into an onboard computer of the vehicle 135, relays the signal by use of a wireless link 902 to the remote-control device 815. The remote-control device 815 may be used to control operational aspects of one or more vehicles located inside the first zone 125 after receiving the vehicle-control enable signal from an entity located inside the first zone 125.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," "example implementation," etc., indicate that the embodiment or implementation described may include a particular feature, structure, or characteristic, but every embodiment or implementation may not necessarily include the particular feature, structure, or characteristic. Moreover, such phrases are not necessarily referring to the same embodiment or implementation. Further, when a particular feature, structure, or characteristic is described in connection with an embodiment or implementation, one skilled in the art will recognize such feature, structure, or characteristic in connection with other embodiments or implementations whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 507, the memory 522, and the memory 532, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
defining a multi-zone geofence for managing vehicle operations, the multi-zone geofence comprising a first zone and a second zone that is located outside the first zone;
determining that a vehicle is within a first zone of the multi-zone geofence;
enabling, by the vehicle and based on the determination that the vehicle is within the first zone, operations of the vehicle subject to a first set of functional restrictions;
determining that the vehicle traverses into the second zone of the multi-zone geofence;
modifying, by the vehicle and based on the determination that the vehicle traverses into the second zone, operations of the vehicle to operations subject a second set of functional restrictions;
determining that the vehicle is traversing within the second zone in a first direction; and
modifying, by the vehicle, based on the determination that the vehicle is traversing within the second zone in the first direction, and while the vehicle is still within the second zone, the second set of functional restrictions.

2. The method of claim 1, wherein a vehicle-control enable signal is transmitted to a remote-control device from a computer located in the first zone.

3. The method of claim 1, wherein a vehicle-control enable signal is relayed to a remote-control device by a signal-relay apparatus located in the vehicle.

4. The method of claim 1, wherein modifying the second set of functional restrictions further comprises reducing the second set of functional restrictions without requiring the vehicle to traverse outside of the second zone, wherein the method further comprises:
determining that the vehicle is traversing within the second zone in a second direction; and
increasing, by the vehicle, based on the determination that the vehicle is traversing within the second zone in the second direction, and while the vehicle is within the second zone, the second set of functional restrictions.

* * * * *